(12) United States Patent
Mader

(10) Patent No.: US 6,282,941 B1
(45) Date of Patent: Sep. 4, 2001

(54) IMPACT DETECTION DEVICE, IN PARTICULAR FOR A MOTOR VEHICLE

(75) Inventor: Gerhard Mader, Thalmassing (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/221,785

(22) Filed: Dec. 28, 1998

Related U.S. Application Data

(63) Continuation of application No. PCT/DE97/01318, filed on Jun. 25, 1997.

(30) Foreign Application Priority Data

Jun. 26, 1996 (DE) .............................. 196 25 618

(51) Int. Cl.⁷ ........................ G01P 21/00; G01P 15/135
(52) U.S. Cl. .............................................. 73/1.39
(58) Field of Search ................................. 73/1.39

(56) References Cited

U.S. PATENT DOCUMENTS 5,506,454 * 4/1996 Hanzawa et al. .................... 307/10.1
5,821,419 * 10/1998 Mader et al. ............................ 73/493
6,016,884 * 1/2000 Swart et al. ............................ 180/282

FOREIGN PATENT DOCUMENTS

| 43 16 263 A1 | 11/1993 | (DE) . |
| 44 11 130 A1 | 10/1995 | (DE) . |
| 195 14 082 C1 | 6/1996 | (DE) . |
| 0 567 938 A1 | 11/1993 | (EP) . |

* cited by examiner

Primary Examiner—Thomas P. Noland
(74) Attorney, Agent, or Firm—Herbert L. Lerner; Laurence A. Greenberg; Werner H. Stemer

(57) ABSTRACT

An impact detection device, in particular for a motor vehicle, includes at least one micromechanical acceleration switch having a contact element to be moved as a function of acceleration and a counter-contact element. A first voltage is fed to terminals of the contact elements by a monitoring circuit in order to detect an impact. A second voltage, through which the contact is closed on the basis of electrostatic forces of attraction, is fed in order to test the acceleration switch.

16 Claims, 2 Drawing Sheets

IMPACT DETECTION DEVICE, IN PARTICULAR FOR A MOTOR VEHICLE

CROSS-REFERENCE TO RELATED APPLICATION

This application is a continuation of copending International application No. PCT/DE97/01318, filed on Jun. 25, 1997, which designated the United States.

BACKGROUND OF THE INVENTION

Field of the Invention

The invention relates to an impact detection device, in particular for a motor vehicle, including at least one micromechanical acceleration switch having a contact element to be moved as a function of acceleration and a counter-contact element. A monitoring circuit, which is electrically conductively connected to a terminal of the contact element and to a terminal of the counter-contact element, has a controllable voltage source and an evaluation device. The impact detection device has an operating state for detecting an impact, in which a voltage is fed to the terminals by the voltage source.

European Patent Application 0 567 938 A1, corresponding to U.S. Pat. No. 5,610,337, has disclosed an impact detection device which has at least one acceleration switch that has a micromechanical structure. Such an acceleration switch essentially contains a contact element which can be moved as a function of acceleration, as well as a counter-contact element. When a defined acceleration is exceeded, the contact of the acceleration switch closes. A monitoring circuit is electrically conductively connected to terminals of the contact elements. A voltage is fed to the terminals in order to detect an impact (see FIG. 1c of European Patent Application 0 567 938 A1, corresponding to U.S. Pat. No. 5,610,337).

In order to test and reset the micromechanical switch, a test electrode is provided which is electrically connected through a separate conductor to the monitoring circuit and which is driven by the monitoring circuit (see FIG. 3a of European Patent Application 0 567 938 A1, corresponding to U.S. Pat. No. 5,610,337). In particular, if the monitoring circuit and the acceleration switch are spatially separated from one another, a line with at least three conductors is necessary between the acceleration switch and the monitoring circuit. The line is provided, on one hand, in order to be able to detect an acceleration-dependent closure of the acceleration switch in the monitoring circuit and, on the other hand, in order to be able to test or reset the acceleration switch through the use of the monitoring circuit.

SUMMARY OF THE INVENTION

It is accordingly an object of the invention to provide an impact detection device, in particular for a motor vehicle, which overcomes the hereinafore-mentioned disadvantages of the heretofore-known devices of this general type and which, in particular, reliably detects a switching operation of an acceleration switch and permits the acceleration switch to perform a self-test with little complexity in terms of circuitry and wiring.

With the objects of the invention in view there is also provided an impact detection device, in particular for a motor vehicle, comprising at least one micromechanical acceleration switch carrying a measurement signal, the acceleration switch having a contact element to be moved as a function of acceleration and having a counter-contact element, the elements each having a respective terminal; a monitoring circuit electrically conductively connected to the terminal of the contact element and to the terminal of the counter-contact element, the monitoring circuit having a controllable voltage source and an evaluation device evaluating the measurement signal tapped at the acceleration switch; the voltage source feeding a first voltage to the terminals in a first operating state of the impact detection device for detecting an impact, the first voltage having a first absolute value; and the voltage source feeding a second voltage to the terminals in a second operating state of the impact detection device for testing the acceleration switch by deflecting the contact element with an electrostatically acting force, the second voltage having a second absolute value greater than the first absolute value.

Therefore, in order to test the acceleration switch, the higher second voltage is fed to the terminals of the contact elements of the acceleration switch by the controllable voltage source of the monitoring circuit. The movable contact element is significantly deflected through the use of the second voltage on the basis of electrostatically acting forces. As a result, the switching contact is closed, with the proviso that the acceleration switch is operationally capable.

The movable contact element and counter-contact element are constructed in this case in such a way that the feeding of the high voltage causes significant deflection of the movable contact element. Small circuit structures of micromechanical acceleration switches are a prerequisite for this deflection. The movable contact element and the counter-contact element are both used as capacitor plates in the test. The electrostatic force of attraction between the movable contact element and the counter-contact element depends in particular on the distance between the two contact elements and on the surface of the contact elements.

In accordance with another feature of the invention, instead of contact elements that are constructed with large surfaces, the acceleration switch has a test electrode which is electrically connected to the counter-contact element, is a large electrode surface, for example, and interacts electrostatically with the movable contact element. The test electrode is connected to the counter-contact element near the acceleration switch so that in all cases only two conductors are necessary between the monitoring circuit and the acceleration switch.

In order to detect an impact in the operating state, the first voltage which is fed by the voltage source and is supplied between the contact elements or contact element and the test electrode is not under any circumstances of such a size that the contact elements are deflected by the electrostatic force of attraction until the acceleration switch closes. The absolute value of the second voltage which is necessary for the induced closure of the acceleration switch in this case is greater than the absolute value of the first voltage.

The measurement signal which is tapped at the acceleration switch is evaluated in the evaluation device of the monitoring circuit. The measurement signal permits conclusions to be drawn regarding, inter alia, the operational capability of the acceleration switch during the test operation and the action of a sufficiently large acceleration on the acceleration switch during the operation for detecting an impact.

The invention has the great advantage that only two conductors are necessary for each acceleration switch, to connect it to the monitoring circuit. Through the use of this impact detection circuit with minimized wiring complexity it is possible to detect acceleration-dependent switching of the acceleration switch and to carry out a self-test of the acceleration switch. The complexity of circuitry in the monitoring circuit is likewise kept extremely small by virtue of the impact detection system according to the invention. These advantages are of particular benefit when connecting a plurality of acceleration switches to the monitoring circuit and, in particular, when there is a spatial separation between the acceleration switch and monitoring circuit. The invention significantly reduces the number of conductors in a cable harness of a motor vehicle.

Other features which are considered as characteristic for the invention are set forth in the appended claims.

Although the invention is illustrated and described herein as embodied in an impact detection device, in particular for a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
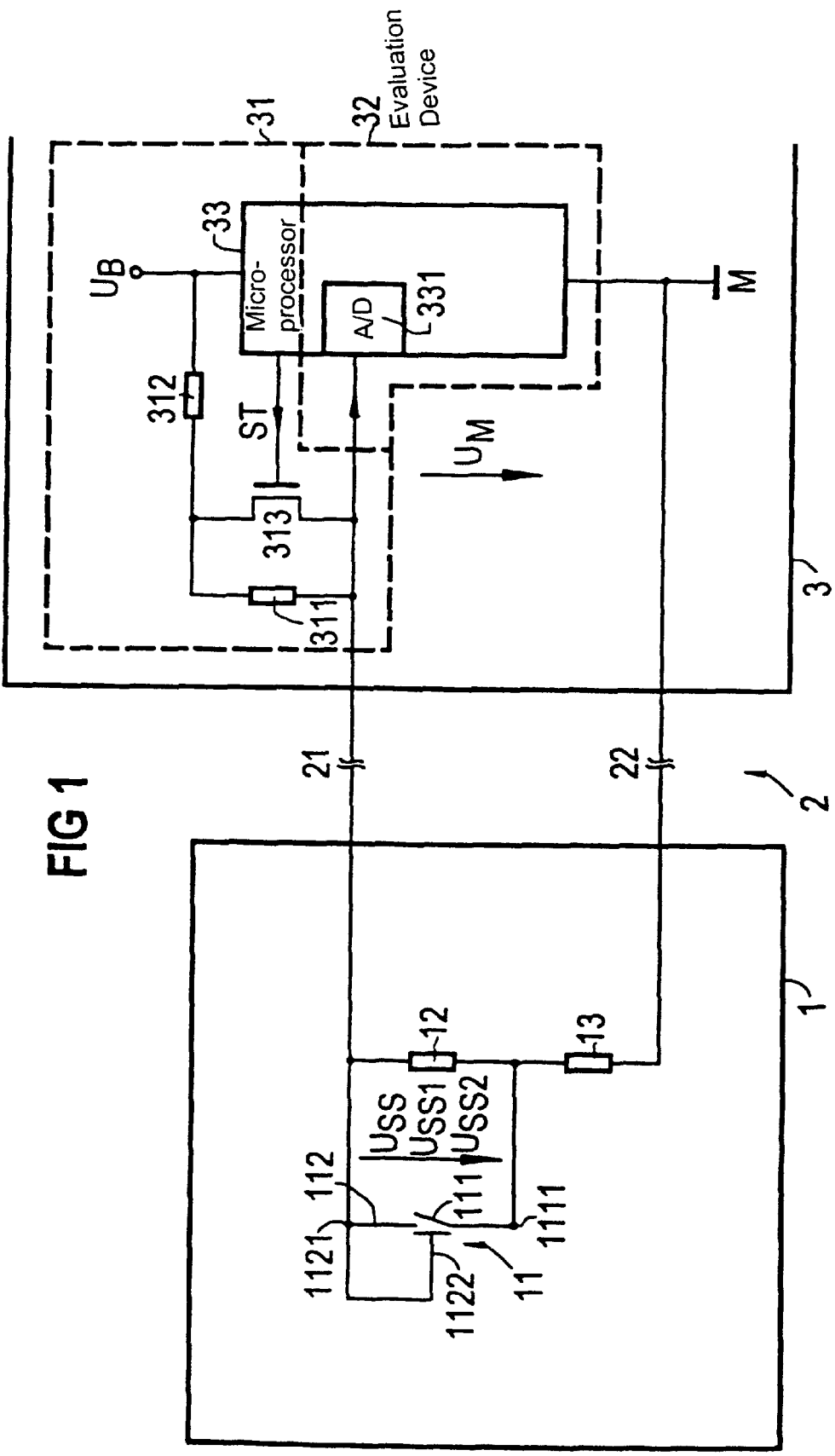
FIG. 1 is a schematic and block circuit diagram of an impact detection device according to the invention.

Referring now in detail to the figures of the drawings, in which identical elements have identical reference symbols, and first, particularly, to FIG. 1 thereof, there is seen a sensor device 1 having an acceleration switch 11, a first measuring resistor 12 and a second measuring resistor 13. The acceleration switch 11 contains a contact element 111, which can be moved as a function of acceleration and has a terminal 1111. The acceleration switch 11 also contains a counter-contact element 112 with a terminal 1121. A test electrode 1122 is electrically connected to the counter-contact element 112. The first measuring resistor 12 is connected parallel to the acceleration switch 11. A voltage between the terminals 1111 and 1121 is a switch voltage $U_{ss}$ and it may assume, in particular, a low first voltage value $U_{ss1}$ and a high second voltage value $U_{ss2}$. The second measuring resistor 13 is connected in series with the acceleration switch 11 and with the first measuring resistor 12.

The sensor device 1 is electrically connected to a monitoring circuit 3 through a two-wire line 2 with first and second conductors 21 and 22.

The monitoring circuit 3 contains a controllable voltage source 31 with an operating voltage source $U_B$, a first operating resistor 311, a controllable switching stage 313 connected parallel to the first operating resistor 311, a second operating resistor 312 connected in series between the operating voltage source $U_B$ and the first operating resistor 311, and a controllable switching stage 33. The monitoring circuit 3 also contains an evaluation device 32. A microprocessor 33 has an analog/digital converter 331 at its measuring input and includes the evaluation device 32 and a control circuit for the controllable voltage source 31.

Without the action of an acceleration force, the acceleration switch 11 is in an opened state in accordance with FIG. 1. A switching path of the switching stage 313, which can be controlled through the use of a control signal ST, is non-conductive. The switch voltage $U_{ss}$ has a low first voltage value $U_{ss1}=U_{B}*R_{12}/(R_{12}+R_{13}+R_{311}+R_{312})$, for example one volt, wherein $R_{12}$ is the resistance value of the resistor 12, etc. An electrostatic force which rises quadratically with the voltage $U_{ss}$ and acts on the contact elements 111 and 112 is not sufficient, at a voltage value $U_{ss1}$, to deflect the movable contact element 111 significantly from its position of rest. At least, the movable contact element 111 is not deflected to the extent that it touches the counter-contact element 112. The resistance values $R_{12}$, $R_{13}$, $R_{311}$ and $R_{312}$ are dimensioned to be such that the above-mentioned first voltage value $U_{ss1}$, is set. The monitoring circuit 3 receives a measurement signal at the measuring input of the analog/digital converter 331, preferably a measurement voltage $U_M=U_B*(R_{12}+R_{13})/(R_{12}+R_{13}+R_{311}+R_{312})$ relative to ground M.

If an acceleration acts on the acceleration switch 11 at a value greater than a threshold which is determined essentially by the structural configuration of the acceleration switch 11, the acceleration switch 11 closes. A measurement voltage $U_M=U_B*R_{13}/(R_{13}+R_{311}+R_{312})$ relative to ground M is detected by the monitoring circuit 3. The threshold is determined, inter alia, by the distance between the contact elements 111 and 112, the configuration and the weight of a seismic mass on the movable contact element 111, the flexural strength of the first contact element 111 and the first switch voltage $U_{ss1}$.

In order to check the operational capability of the acceleration switch 11, the acceleration switch 11 is closed by the monitoring circuit 3 in an electrically induced manner. For this purpose, the switching path of the controllable switching stage 313 is conductively controlled, so that the first operating resistor 311 is short-circuited. The switch voltage $U_{ss}$ initially assumes a second, high voltage value $U_{ss2}=U_B*R_{12}/(R_{12}+R_{13}+R_{312})$ of approximately 2 to 5 volts. In this way, the electrostatic force of attraction on the movable element 111, which is caused by the second voltage value $U_{ss2}$, is of such a magnitude that the movable contact element 111 moves out of its position of rest onto the counter-contact element 112 and touches it. The switch voltage at the closed acceleration switch 11 subsequently collapses. The measurement voltage $U_M$ is $U_B* R_{13}/(R_{13}+R_{312})$.

If the acceleration switch 11 is defective and does not close due to the high voltage value $U_{ss2}$ fed to it, the measurement voltage $U_M=U_B*(R_{12}+R_{13})/(R_{12}+R_{13}+R_{312})$.

In the case of a line short-circuit between the first and second conductors 21 and 22, a measurement voltage $U_M$ of 0 volts or ground potential is received at the measuring input.

All of the described states of the impact detection device can be unambiguously derived from the magnitude of the measurement voltage $U_M$. In particular, when the impact detection circuit is used in a motor vehicle with a decentralized sensor device 1 and long line paths, the inventive configuration of the second measuring resistor 13 is advantageous. That is because, in this way, a line short-circuit can also be distinguished from a switching signal and from a defective acceleration switch 11. If it is not necessary to detect a line short-circuit, the second measuring resistor $R_{13}$ may be dispensed with.

Figure 2:
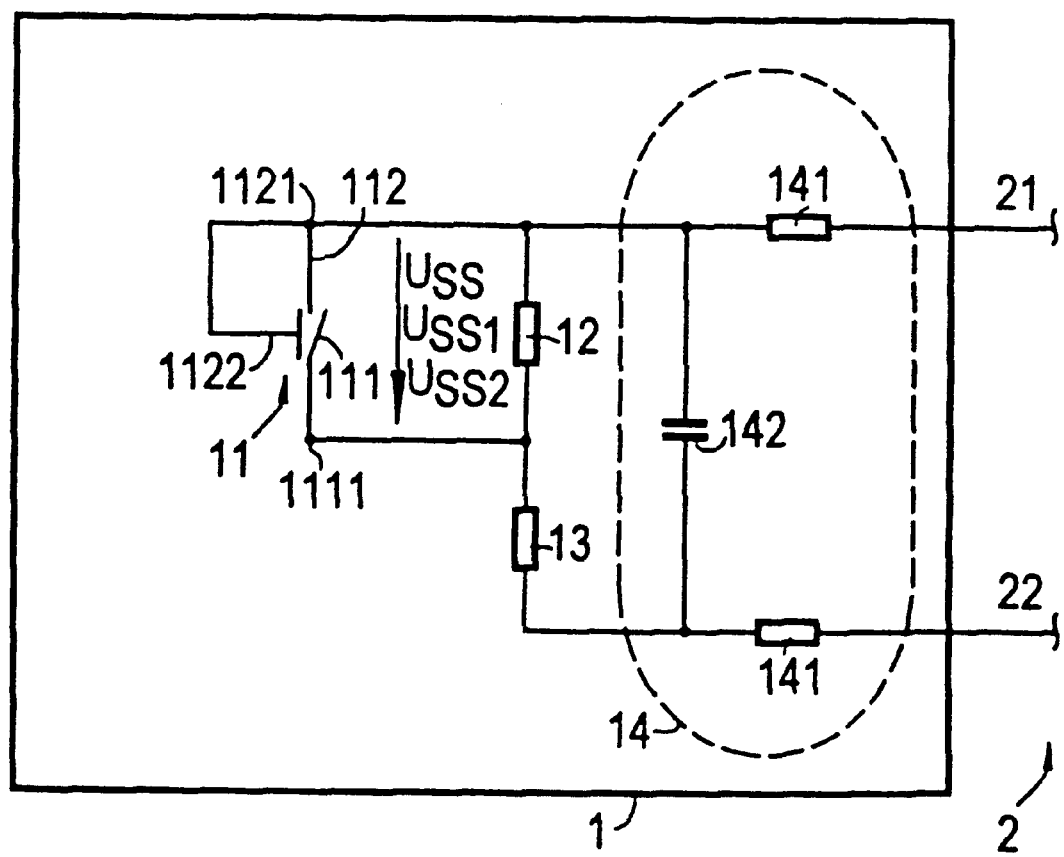
FIG. 2 is a schematic circuit diagram of a sensor device of an impact detection device.

FIG. 2 shows a sensor device 1 in accordance with FIG. 1. The sensor device 1 additionally contains a filter circuit 14 with a filter capacitor 142 and two filter resistors 141. The filter circuit 14 has a low-pass character with a low limiting frequency of approximately 10 kHz. As a result, high-frequency interference signals on the two-wire line 2 do not cause the acceleration switch 11 to close. That would be incorrectly interpreted by the monitoring circuit 3 as a closure brought about as a function of acceleration or due to a test. The filter resistors 141 are to be dimensioned in this case in such a way that the second voltage value $U_{ss2}$ is sufficient to close the acceleration switch 11.

The invention includes an impact detection device which has an acceleration switch that is closed in its position of rest, that is to say without the action of an acceleration, and which opens under the action of an acceleration. The switch voltages $U_{ss}$, $U_{ss1}$, $U_{ss2}$ are to be given appropriate polarities and dimensioned appropriately.

The acceleration switch 11 may be a component of an acceleration sensor which is composed of a plurality of acceleration switches 11 and in which each acceleration switch 11 is assigned a different threshold. The acceleration switch 11 may also be used as a safing sensor for an airbag controller. Instead of the microprocessor 33, some other evaluation circuit may be used.

The self-test of the acceleration switch 11 may be carried out within an initialization routine wherein the impact detection device or the associated airbag control unit is put into operation, or else cyclically during the operation of the impact detection device.

I claim:

1. An impact detection device, comprising:
   at least one micromechanical acceleration switch carrying a measurement signal, said acceleration switch having a contact element to be moved as a function of acceleration and having a counter-contact element, said elements each having a respective terminal;
   a monitoring circuit electrically conductively connected to said terminal of said contact element and to said terminal of said counter-contact element, said monitoring circuit having a controllable voltage source and an evaluation device evaluating said measurement signal tapped at said acceleration switch;
   said voltage source feeding a first voltage to said terminals in a first operating state for detecting an impact, said first voltage having a first value;
   said voltage source feeding a second voltage to said terminals in a second operating state for testing said acceleration switch by deflecting said contact element with an electrostatically acting force, said second voltage having a second value greater than said first value; and
   a test electrode acting on said movable contact element and electrically connected to said counter-contact element.

2. The impact detection device according to claim 1, wherein said movable contact element has a seismic mass and is deflected under the effect of an acceleration force, and said counter-contact element is a stop.

3. The impact detection device according to claim 1, wherein said counter-contact element has a large surface.

4. The impact detection device according to claim 1, wherein said measurement voltage is tapped at one of said contact elements.

5. An impact detection device, comprising:
   at least one micromechanical acceleration switch carrying a measurement signal, said acceleration switch having a contact element to be moved as a function of acceleration and having a counter-contact element, said elements each having a respective terminal;
   a monitoring circuit electrically conductively connected to said terminal of said contact element and to said terminal of said counter-contact element, said monitoring circuit having a controllable voltage source and an evaluation device evaluating said measurement signal tapped at said acceleration switch;
   said voltage source feeding a first voltage to said terminals in a first operating state for detecting an impact, said first voltage having a first value;
   said voltage source feeding a second voltage to said terminals in a second operating state for testing said acceleration switch by deflecting said contact element with an electrostatically acting force, said second voltage having a second value greater than said first value; and
   a measuring resistor connected parallel to said acceleration switch.

6. The impact detection device according to claim 5, wherein said movable contact element has a seismic mass and is deflected under the effect of an acceleration force, and said counter-contact element is a stop.

7. The impact detection device according to claim 5, wherein said counter-contact element has a large surface.

8. The impact detection device according to claim 5, wherein said measurement voltage is tapped at one of said contact elements.

9. An impact detection device, comprising:
   at least one micromechanical acceleration switch carrying a measurement signal, said acceleration switch having a contact element to be moved as a function of acceleration and having a counter-contact element, said elements each having a respective terminal;
   a monitoring circuit electrically conductively connected to said terminal of said contact element and to said terminal of said counter-contact element, said monitoring circuit having a controllable voltage source and an evaluation device evaluating said measurement signal tapped at said acceleration switch;
   said voltage source feeding a first voltage to said terminals in a first operating state for detecting an impact, said first voltage having a first value;
   said voltage source feeding a second voltage to said terminals in a second operating state for testing said acceleration switch by deflecting said contact element with an electrostatically acting force, said second voltage having a second value greater than said first value;
   said acceleration switch is disposed spatially separate from said monitoring circuit, and a two-wire line electrically connects said acceleration switch to said monitoring circuit; and
   a sensor device disposed spatially separate from said monitoring circuit and having said acceleration switch, a first measuring resistor connected parallel to said acceleration switch and a second measuring resistor connected in series with said acceleration switch and said first measuring resistor.

10. The impact detection device according to claim 9, wherein said movable contact element has a seismic mass and is deflected under the effect of an acceleration force, and said counter-contact element is a stop.

11. The impact detection device according to claim 9, wherein said counter-contact element has a large surface.

12. The impact detection device according to claim 9, wherein said measurement voltage is tapped at one of said contact elements.

13. An impact detection device, comprising:

at least one micromechanical acceleration switch carrying a measurement signal, said acceleration switch having a contact element to be moved as a function of acceleration and having a counter-contact element, said elements each having a respective terminal;

a monitoring circuit electrically conductively connected to said terminal of said contact element and to said terminal of said counter-contact element, said monitoring circuit having a controllable voltage source and an evaluation device evaluating said measurement signal tapped at said acceleration switch;

said voltage source feeding a first voltage to said terminals in a first operating state for detecting an impact, said first voltage having a first value;

said voltage source feeding a second voltage to said terminals in a second operating state for testing said acceleration switch by deflecting said contact element with an electrostatically acting force, said second voltage having a second value greater than said first value;

said voltage source has a first operating resistor, a second operating resistor connected in series with said first operating resistor, a controllable switching stage connected parallel to said first operating resistor, and an operating voltage source; and said first and second operating resistors connect one of said contact elements to said operating voltage source.

14. The impact detection device according to claim 13, wherein said movable contact element has a seismic mass and is deflected under the effect of an acceleration force, and said counter-contact element is a stop.

15. The impact detection device according to claim 13, wherein said counter-contact element has a large surface.

16. The impact detection device according to claim 13, wherein said measurement voltage is tapped at one of said contact elements.

* * * * *